(12) United States Patent
Zhong et al.

(10) Patent No.: US 8,121,183 B2
(45) Date of Patent: Feb. 21, 2012

(54) SYSTEM FOR AN ADAPTIVE FLOATING TAP DECISION FEEDBACK EQUALIZER

(75) Inventors: Lizhi Zhong, Sunnyvale, CA (US); Ye Liu, San Jose, CA (US); Catherine Yuk-fun Chow, San Jose, CA (US); Ryan Jungsuk Park, San Jose, CA (US); Freeman V. Zhong, San Ramon, CA (US); Amaresh V. Malipatil, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 1256 days.

(21) Appl. No.: 11/777,337

(22) Filed: Jul. 13, 2007

(65) Prior Publication Data

US 2009/0016422 A1    Jan. 15, 2009

(51) Int. Cl.
*H03K 5/159*    (2006.01)
(52) U.S. Cl. ......... 375/230; 375/233; 375/229; 375/234
(58) Field of Classification Search .................. 375/230, 375/233, 229, 234; 333/18, 28
See application file for complete search history.

(56) References Cited

U.S. PATENT DOCUMENTS

| | | | | |
|---|---|---|---|---|
| 6,012,161 | A | 1/2000 | Ariyavisitakul et al. | 375/341 |
| 6,563,868 | B1 * | 5/2003 | Zhang et al. | 375/232 |
| 6,636,561 | B1 * | 10/2003 | Hudson | 375/232 |
| 6,744,814 | B1 * | 6/2004 | Blanksby et al. | 375/232 |
| 7,030,657 | B2 | 4/2006 | Stojanovic et al. | 326/87 |
| 7,352,830 | B2 * | 4/2008 | Lewis | 375/343 |
| 2005/0152295 | A1 * | 7/2005 | Reznik | 370/310 |
| 2007/0110174 | A1 * | 5/2007 | Glazko et al. | 375/260 |
| 2009/0086808 | A1 * | 4/2009 | Liu et al. | 375/233 |

OTHER PUBLICATIONS

Michael J. Lopez et al., "ADFE Coefficient placement Algorithm for sparse reverberant channels", IEEE Transactions on Communications, vol. 49, No. 8, pp. 1334-1338, Aug. 2001.*
S. Ariyavisitakul et al., "Tap-Selectable Decision Feedback Equalization", IEEE Transactions on Communications, vol. 45, No. 12, pp. 1497-1500, Dec. 1997.
E.F. Haratsch et al., "Reduced-State Sequence Estimation With Tap-Selectable Decision-Feedback", ICC 2000.

* cited by examiner

*Primary Examiner* — Eva Puente
*Assistant Examiner* — Helene Tayong
(74) *Attorney, Agent, or Firm* — Christopher P. Maiorana, PC

(57) ABSTRACT

A method for adaptive selection of floating taps in a decision feedback equalizer including the steps of (A) determining values for a predefined metric for tap positions within a range covered by a decision feedback equalizer (DFE) and (B) setting one or more floating taps of the DFE to tap positions based upon the values of the predefined metric.

24 Claims, 9 Drawing Sheets

SYSTEM FOR AN ADAPTIVE FLOATING TAP DECISION FEEDBACK EQUALIZER

FIELD OF THE INVENTION

The present invention relates to the communications field generally and, more particularly, to a system for an adaptive floating tap decision feedback equalizer (DFE).

BACKGROUND OF THE INVENTION

Inter symbol interference (ISI) resulting from a communications channel can greatly reduce an eye opening at an input of a receiver. A decision feedback equalizer (DFE) can be used to reduce ISI. However, reflections in the communications channel can cause ISI in a wide range of symbols. To reduce ISI in the wide range of symbols, a DFE with a large number of taps is used. The DFE with a large number of taps consumes a lot of power and area.

Reflections occur in only a few symbols of the wide range of symbols. A floating tap DFE assigns taps only to where the reflections occur. By doing so, the number of DFE taps can be significantly reduced. However, the locations of reflections can vary with channel. Even for the same channel, the reflections can change, for example, with temperature. Finding the floating tap positions for a floating tap DFE is a significant problem.

Conventional methods for finding the floating tap positions include: 1) setting the floating tap positions manually; 2) measuring a pulse response of a channel using an instrument offline and setting the floating tap positions manually based on the measured pulse response; 3) using a training sequence to estimate the pulse response of the channel and selecting the floating tap positions based on the estimated channel pulse response; 4) selecting the floating tap positions based on tap signal-to-noise ratio (SNR) or channel impulse coefficients.

The conventional methods have a number of disadvantages. There can be many channels (200+) in backplane applications. Each of the channels can have different reflection locations. Many channels with different reflection locations makes manually setting the floating tap positions impractical. Using a training sequence adds a large overhead in a Gigabit per second (Gbps) serializer/deserializer (SerDes). The training sequence interrupts normal data traffic. The training sequence can only determine the floating tap positions during initialization. If the reflection locations change due to temperature or for some other reason, the conventional methods cannot update the floating tap positions unless the data traffic is interrupted and the training sequence is inserted again. The disadvantage of basing the floating tap positions on the tap SNR or channel impulse coefficients is that the tap SNR and channel impulse coefficients are not usually available, making the use of SNR and channel impulse coefficients unrealistic.

SUMMARY OF THE INVENTION

The present invention concerns a method for adaptive selection of floating taps in a decision feedback equalizer (DFE) including the steps of (A) determining values for a predefined metric for tap positions within a range covered by a decision feedback equalizer (DFE) and (B) setting one or more floating taps of the DFE to tap positions based upon the values of the predefined metric.

The objects, features and advantages of the present invention include providing a method and/or architecture for an adaptive floating tap decision feedback equalizer (DFE) that may (i) allow the floating tap positions to be found without human intervention, (ii) be implemented without overhead, (iii) allow floating tap positions to be found online in real time without interrupting normal data traffic, (iv) allow the floating tap positions to be updated dynamically after reflections change locations, (v) provide performance similar to an N1+N2*M tap DFE using only N1+N2N2 taps, (vi) allow the floating tap positions to be set independently, (vii) search for the floating tap positions in parallel, (viii) significantly reduce the total search time, (ix) provide guaranteed performance in the search mode with a number of fixed taps cancelling most of the ISI during each slide, (x) use a combination of fixed and floating taps to exploit channel properties and simplify implementation and/or (xi) provide increased confidence on the tap weights obtained by implementing fixed taps.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Decision feedback equalization (DFE) is a fundamental technology used in many fields. For example, DFE may be used in any application involving a communication link (e.g., both wired and wireless channels). The term DFE is used herein to generally refer to both the decision feedback equalization process and an apparatus (or architecture) that performs decision feedback equalization (e.g., a decision feedback equalizer).

In one example, a DFE in accordance with the present invention may be used in wireless applications including, but not limited to, digital video terrestrial transmission, High Definition Television (HDTV), digital television (DTV), Mobile TV, underwater acoustic telemetry, broadband wireless, fixed wireless access, microwave links, wireless local area networks, (WLAN), cellular networks (e.g., GSM, TDMA, CDMA, etc.), multiple-input multiple output (MIMO), indoor wireless, audio monitors, monitoring of radio data transmissions, position detection in automotive applications, and/or satellite communications. In another example, a DFE in accordance with the present invention may be used in wired applications including, but not limited to, two-wire channels, Gigabit Ethernet, 10G Ethernet, high-speed backplane data communications, long-haul WDM systems/fiber/optical fiber communications, DSL/ADSL/dial-up telephone network/voice band modem, disk drive applications, magnetic storage, digital holographic optical memory systems, cable modem/CATV/video and data services through coaxial cable networks, and digital calibration of analog impairments.

Figure 1:
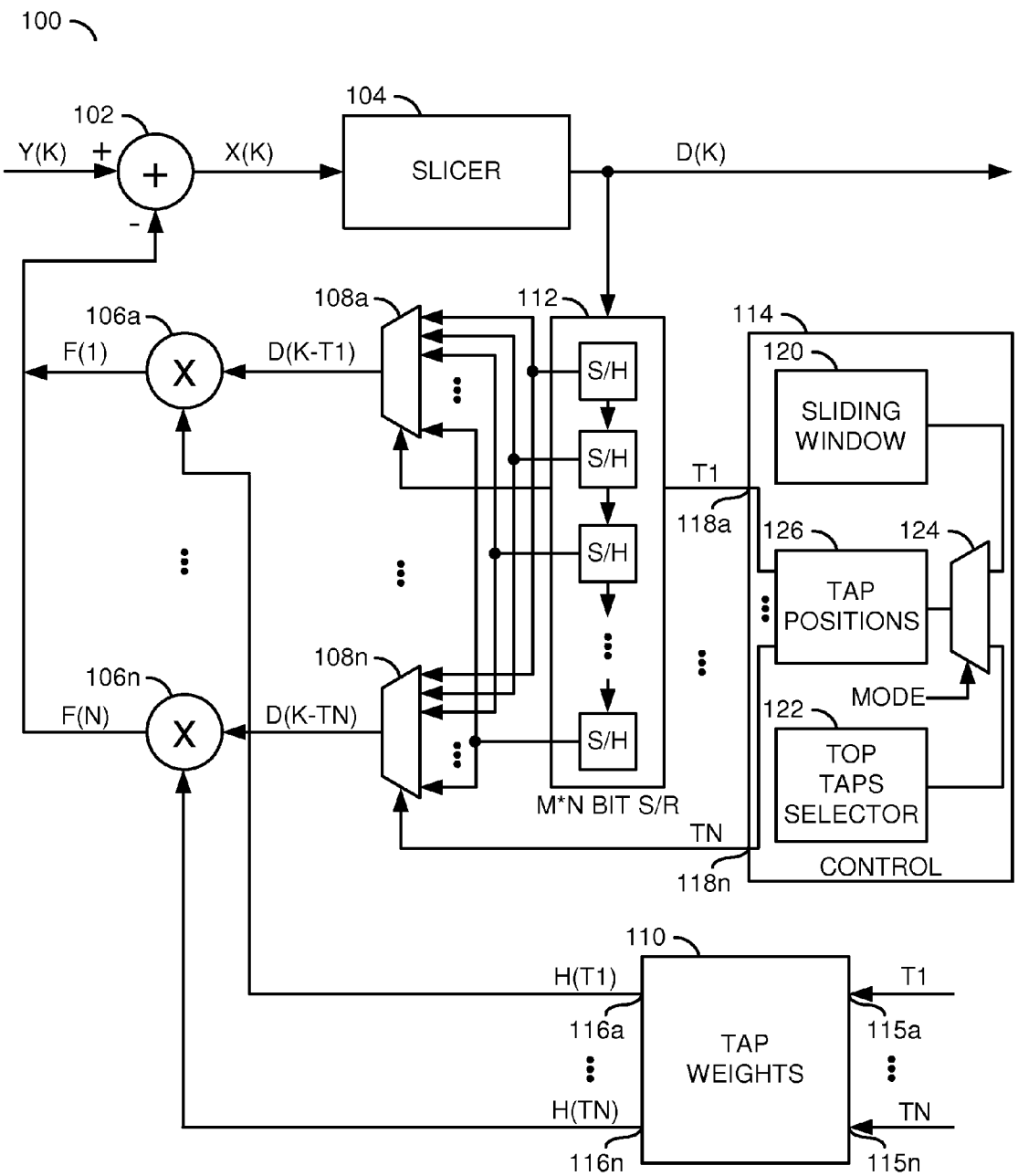
FIG. 1 is a block diagram illustrating an embodiment of an adaptive floating tap decision feedback equalizer in accordance with the present invention.

Referring to FIG. 1, a block diagram of a decision feedback equalizer (DFE) 100 is shown illustrating an embodiment of an adaptive floating tap decision feedback equalizer in accordance with the present invention. In one example, the DFE 100 may be implemented as part of a serial transceiver. In one example, the DFE 100 may be implemented as part of a serializer/deserializer (SerDes) receiver in a backplane application. In one embodiment, the DFE 100 may be implemented with all taps being floating taps. The DFE 100 may comprise a block (or circuit) 102, a block (or circuit) 104, a number of blocks (or circuits) 106a-106n, a number of blocks (or circuits) 108a-108n, a block. (or circuit) 110, a block (or circuit 112) and a block (or circuit) 114.

The block 102 may be implemented as an adder (or summation circuit). The block 104 may be implemented as a slicer (or data sampler). The blocks 106a-106n may be implemented as multipliers. The blocks 108a-108n may be implemented as multiplexers. The block 110 may be implemented as a tap weights control block. The block 112 may be implemented as an M*N bit shift register, where N represents a number of taps in the DFE 100 and M represents a number of times a sliding window of width N would slide to cover a predetermined range of taps to be covered by the DFE 100. In one example, the block 112 may be implemented using sample and hold (S/H) blocks. In another example, the block 112 may be implemented as a number of registers. The block 114 may be implemented as a control block. In one example the block 114 may control the number of floating tap positions of the DFE 100. The blocks 106a-106n, the blocks 108a-108n and the block 112 may be configured to form weighted feedback paths.

The block 102 may have a first input that may receive a signal (e.g., Y(K)), a second input that may receive a number of feedback signals (e.g., F(1), . . . , F(N)) and an output that may present a signal (e.g., X(K)). The signal Y(K) may be implemented as a channel signal, where K represents an index to a current symbol. The signal X(K) may be implemented as an equalized version of the signal Y(K). The block 102 may be configured to generate the signal X(K) by subtracting the feedback signals F(1), . . . , F(N) from the signal Y(K). The block 104 may have an input that may receive the signal X(K) and an output that may present a signal (e.g., D(K)). The signal D(K) may comprise samples (or slices) of the signal X(K).

Each of the blocks 106a-106n may have an output that may present a respective one of the signals F(1), . . . , F(N), a first input that may receive a respective one of a number of tap signals (e.g. D(K−T1), . . . , D(K−TN)) and a second input that may receive a respective one of a number of tap weight signals (e.g., H(T1), . . . , H(TN)). The blocks 106a-106n may be configured to generate the signals F(1), . . . , F(N) in response to the signals D(K−T1), . . . , D(K−TN) and H(T1), . . . , H(TN).

Each of the blocks 108a-108n may have an output that may present a respective one of the signals D(K−T1), . . . , D(K−TN), a control input that may receive a respective one of a number of tap position control signals (e.g., T1, . . . , TN) and a plurality of inputs that may receive a plurality of samples of the signal D(K). In one example, each of the blocks 108a-108n may receive M*N samples. The blocks 108a-108n may be configured to select one of the plurality of sample signals for presentation as a respective one of the signals D(K−T1), . . . , D(K−TN) in response to a respective one of the signals T1, . . . , TN.

The block 110 may have a number of inputs 115a-115n that may receive the signals T1, . . . , TN and a number of outputs 116a-116n that may present the signals H(T1), . . . , H(TN). The block 110 may be implemented using conventional techniques for generating tap weights for the respective tap positions. The block 112 may have an input that may receive the signal D(K) and a plurality of outputs that may present the sample signals to the blocks 108a-108n. The block 114 may have a number of outputs 118a-118n that may present the signals T1, . . . , TN to the control inputs of the blocks 108a-108n. In a search mode in accordance with the present invention, the signals T1, . . . , TN may be generated based upon a position of a sliding window. In an operating mode in accordance with the present invention, the signals T1, . . . , TN may be generated based upon a top tap selection criteria in accordance with the present invention.

The signals T1, . . . , TN may be implemented as tap selection signals and the signals H(T1), . . . , H(TN) may be implemented as tap weight signals. The signals T1, . . . , TN generally represent tap positions of the DFE 100. The tap positions represented by the signals T1, . . . , TN may be noncontiguous. The signals H(T1), . . . , H(TN) generally represent tap weights corresponding to the tap positions associated with the signals T1, . . . , TN.

The block 114 may comprise a block (or circuit) 120, a block (or circuit) 122, a block (or circuit) 124 and a block (or circuit) 126. The block 120 may implement a sliding window technique in accordance with the present invention. The block 122 may determine a number of floating tap positions most likely corresponding with locations of reflections in the communications channel. The block 124 may select an output of the block 120 or an output of the block 122 for presentation to an input of the block 126 in response to a signal (e.g., MODE). The signal MODE may have a first state representing a search mode of the DFE 100 and a second state representing an operating mode of the DFE 100. The block 126 may generate the tap position signals T1, . . . , TN in response to the signal(s) received from the block 124.

In one example, the signal X(K) may be expressed using the following Equation 1:

$$X(k) = Y(k) - \sum_{i=1}^{N} H(i)D(k-i), \quad \text{Eq. 1}$$

where i represents the tap position, D(k−i) represents the slicer output at symbol k−i (or i symbols before the current symbol), H(i) represents the tap weight of tap i, and N represents the total number of taps of the DFE 100. In one example, the DFE 100 may be implemented with eight feedback paths (e.g., N=8). The present invention generally allows the DFE 100 implemented with, for example, eight taps to perform similarly to a decision feedback equalizer implemented with forty taps. For example, the control block 114, implementing a tap selection process in accordance with the present invention, may generate the signals T1, . . . , TN such that the selected taps correspond to the most significant locations (e.g., reflection locations) of the signal D(K). For example, with reference to Equation 1 above, the signals T1, . . . , TN may be generated such that i∈{1, 2, 3, 4, 5, 7, 30, 32}.

Figure 2:
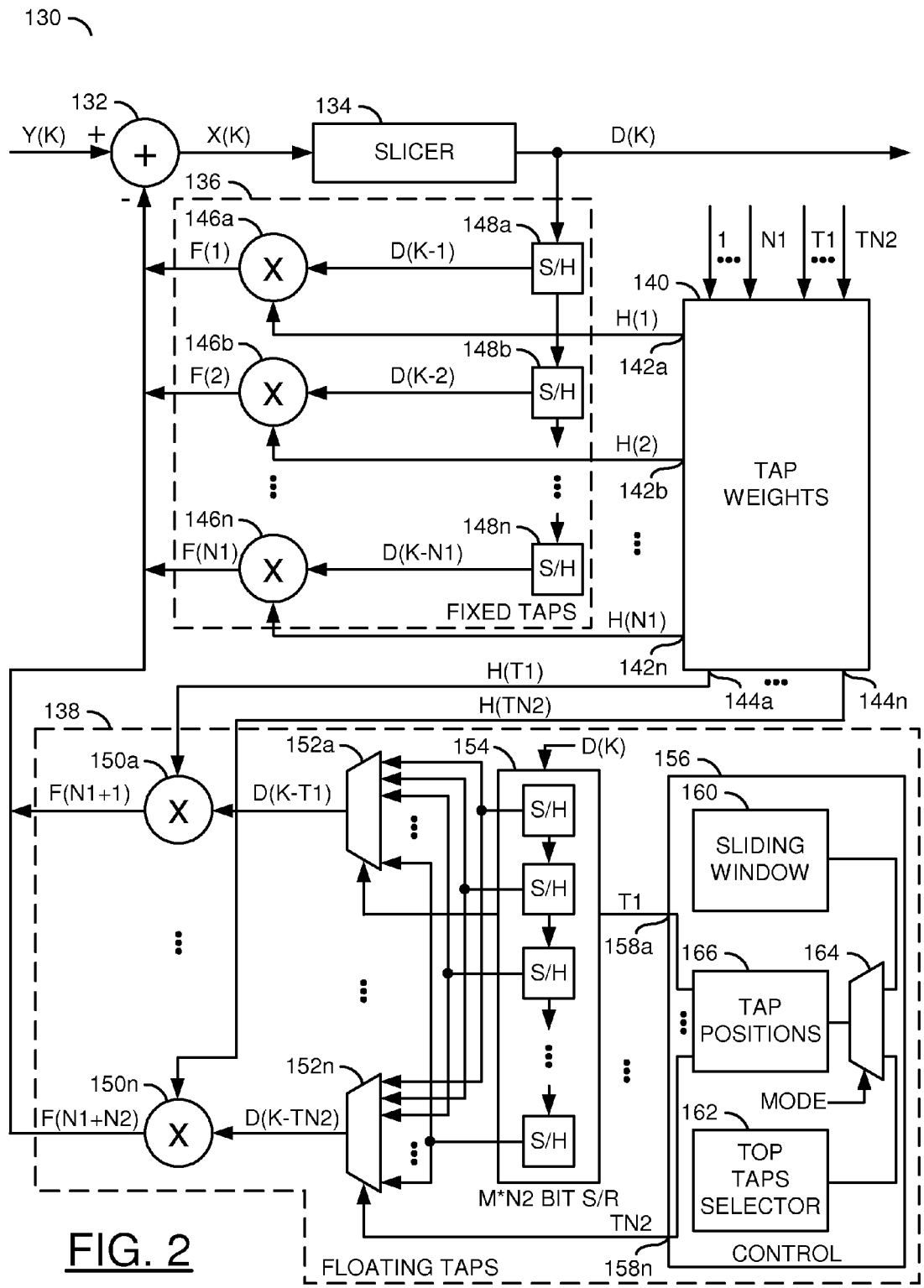
FIG. 2 is a block diagram illustrating another embodiment of an adaptive floating tap decision feedback equalizer in accordance with the present invention.

Referring to FIG. 2, a block diagram of a decision feedback equalizer (DFE) 130 is shown illustrating another embodiment of an adaptive floating tap decision feedback equalizer in accordance with the present invention. The DFE 130 may be implemented with a number of fixed tap positions (e.g., N1) and a number of floating tap positions (e.g., N2). The mixture of fixed and floating tap positions may be beneficial when delay due to multiplexers such as the blocks 108a-108n in FIG. 1 is significant for the particular application.

The DFE 130 may comprise a block (or circuit) 132, a block (or circuit) 134, a block (or circuit) 136, a block (or circuit) 138 and a block (or circuit) 140. The block 132 may be implemented as an adder. The block 134 may be implemented as a slicer (or data sampler). The block 136 may be implemented as a fixed taps block. The block 138 may be implemented as a floating taps block. The block 140 may be implemented as a tap weights control block.

The block 132 may have a first input that may receive a signal (e.g., Y(K)), a second input that may receive a number of feedback signals (e.g., F(1), . . . , F(N1+N2)) and an output that may present a signal (e.g., X(K)). The signal Y(K) may be implemented as a channel signal. The signal X(K) may be implemented as an equalized version of the signal Y(K). The block 102 may be configured to generate the signal X(K) by subtracting the feedback signals F(1), . . . , F(N1+N2) from the signal Y(K). The block 104 may have an input that may receive the signal X(K) and an output that may present a signal (e.g., D(K)). The signal D(K) may comprise samples (or slices) of the signal X(K).

The block 136 may have a number of outputs that may present the signals F(1), . . . , F(N1), a first input that may receive the signal D(K) and a number of second inputs that may receive a number of respective tap weight signals (e.g., H(1), . . . , H(N1)). The signals H(1), . . . , H(N1) generally represent tap weights corresponding to the tap positions associated with the N1 fixed taps implemented by the block 136.

The block 138 may have a number of outputs that may present the signals F(N1+1), . . . , F(N1+N2), a first input that may receive the signal D(K) and a number of second inputs that may receive a number of respective tap weight signals (e.g., H(T1), . . . , H(TN1)). The signals H(T1), . . . , H(TN1) generally represent tap weights corresponding to the tap positions associated with the N2 floating taps implemented by the block 138. The block 140 may have a number of inputs that may receive a number of tap positions control signals (e.g., 1, . . . , N1 and T1, . . . , TN2), a number of first outputs 142a-142n that may present the signals H(1), . . . , H(N1) and a number of second outputs 144a-144n that may present the signals H(T1), . . . , H(TN2). The block 140 may be implemented using conventional techniques for generating tap weights.

The block 136 may comprise a number of blocks (or circuits) 146a-146n and a number of blocks (or circuits) 148a-148n. The blocks (or circuits) 146a-146n may be implemented as multipliers. The blocks 148a-148n may be implemented, in one example, as registers. In one example, the blocks 148a-148n may be implemented as sample and hold (S/H) circuits. Each of the blocks 146a-146n may have an output that may present a respective one of the signals F(1), . . . , F(N1), a first input that may receive a respective one of a number of tap signals (e.g. D(K−1), . . . , D(K−N1)) and a second input that may receive a respective one of the tap weight signals H(1), . . . , H(N1). The blocks 146a-146n may be configured to generate the signals F(1), . . . , F(N1) in response to the signals D(K−1), . . . , D(K−N1) and H(1), . . . , H(N1). The blocks 148a-148n may be coupled such that the block 148a receives the signal D(K) at an input and the blocks 148b-148n receive an output of a previous one of the blocks 148a-148n. Each of the blocks 148a-148n may have an output that may present a respective one of the signals D(K−1), . . . , D(K−N1).

The block 138 may comprise a number of blocks (or circuits) 150a-150n, a number of block (or circuits) 152a-152n, a block (or circuit) 154 and a block (or circuit) 156. The blocks 150a-150n may be implemented as multipliers. The blocks 152a-152n may be implemented as multiplexers. The block 154 may be implemented as an M*N2 bit shift register, where N2 represents the number of floating taps in the DFE 130 and M represents a number of times a sliding window of width N2 would slide to cover a predetermined range of taps to be covered by the DFE 130. In one example, the block 154 may be implemented using sample and hold (S/H) blocks. In another example, the block 154 may be implemented as a number of registers. The block 156 may be implemented as a control block. In one example the block 156 may control the number of floating tap positions of the DFE 130.

Each of the blocks 150a-150n may have an output that may present a respective one of the signals F(N1+1), . . . , F(N1+N2), a first input that may receive a respective one of a number of tap signals (e.g. D(K−T1), . . . , D(K−TN2)) and a second input that may receive a respective one of the tap weight signals H(T1), . . . , H(TN). The blocks 150a-150n may be configured to generate the signals F(N1+1), . . . , F(N1+N2) in response to the signals D(K−T1), . . . , D(K−TN2) and the signals H(T1), . . . , H(TN2).

Each of the blocks 152a-152n may have an output that may present a respective one of the signals D(K−T1), . . . , D(K−TN2), a control input that may receive a respective one of a number of tap position control signals (e.g., T1, . . . , TN2) and a plurality of inputs that may receive a plurality of samples of the signal D(K). In one example, each of the blocks 152a-152n may receive M*N2 sample signals. The blocks 152a-152n may be configured to select one of the plurality of sample signals for presentation as a respective one of the signals D(K−T1), . . . , D(K−TN2) in response to a respective one of the signals T1, . . . , TN2.

The block 154 may have an input that may receive the signal D(K) and a plurality of outputs that may present the sample signals to the blocks 152a-152n. The block 156 may have a number of outputs 158a-158n that may present the signals T1, . . . , TN2 to the control inputs of the blocks 152a-152n. In a search mode in accordance with the present invention, the signals T1, . . . , TN2 may be generated based upon a position of a sliding window. In an operating mode in accordance with the present invention, the signals T1, . . . , TN2 may be generated based upon a top tap selection criteria in accordance with the present invention.

The block 156 may comprise a block (or circuit) 160, a block (or circuit) 162, a block (or circuit) 164 and a block (or circuit) 166. The block 160 may implement a sliding window technique in accordance with the present invention. The block 162 may determine a number of floating tap positions most likely corresponding with locations of reflections in the communications channel (e.g., a top N2 positions out of 2*N2 positions). The block 164 may select an output of the block 160 or an output of the block 162 for presentation to an input of the block 166 in response to a signal (e.g., MODE). The signal MODE may have a first state representing a search mode of the DFE 130 and a second state representing an operating mode of the DFE 130. The block 166 may generate the tap position signals T1, . . . , TN2 in response to the signal(s) received from the block 164.

The signals T1, . . . , TN2 may be implemented as tap selection signals and the signals H(T1), . . . , H(TN2) may be implemented as tap weight signals. The signals T1, . . . , TN2 generally represent floating tap positions of the DFE 130. Although the fixed tap positions of the DFE 130 appear to be contiguous, both the fixed tap positions implemented in the block 136 and the floating tap positions represented by the signals T1, . . . , TN2 may be noncontiguous. The signals H(1), . . . , H(N1) generally represent tap weights corresponding to the fixed tap positions implemented in the block 136. The signals H(T1), . . . , H(TN2) generally represent tap weights corresponding to the floating tap positions associated with the signals T1, . . . , TN2.

In one example, the signal X(K) may be expressed using the following Equation 2:

$$X(k) = Y(k) - \sum_{i=1}^{N1} H(i)D(k-i) - \sum_{Ti=1}^{N2} H(Ti)D(k-Ti), \quad \text{Eq. 2}$$

where i represents the tap position of the fixed taps, Ti represents the tap position of the floating taps, D(k−i) represents the slicer output at symbol k−i (or i symbols before the current symbol), H(i) represents the tap weight of tap i, N1 represents the total number of fixed taps and N2 represents the total number of floating taps of the DFE 130. In one example, the DFE 130 may be implemented with eight feedback paths (e.g., N1=4 and N2=4). The present invention generally allows the DFE 130 implemented with, for example, eight taps to perform similarly to a decision feedback equalizer implemented with forty taps. For example, the control block 160, implementing a tap selection process in accordance with the present invention, may generate the signals T1, . . . , TN2 such that the selected taps correspond to the most significant locations (e.g., reflection locations) of the signal D(K). For example, with reference to Equation 2 above, the fixed tap positions and the signals T1, . . . , TN2 may be generated such that i∈{1, 2, 3, 4, 5, 7, 30, 32}. In general, the first taps are not necessarily consecutive taps, or the first couple of taps. However, when the first couple of taps are more sensitive to latency, it may be desirable to assign the first couple of taps to the fixed taps portion 136 to avoid delay in the multiplexers 152a-152n.

Figure 3:
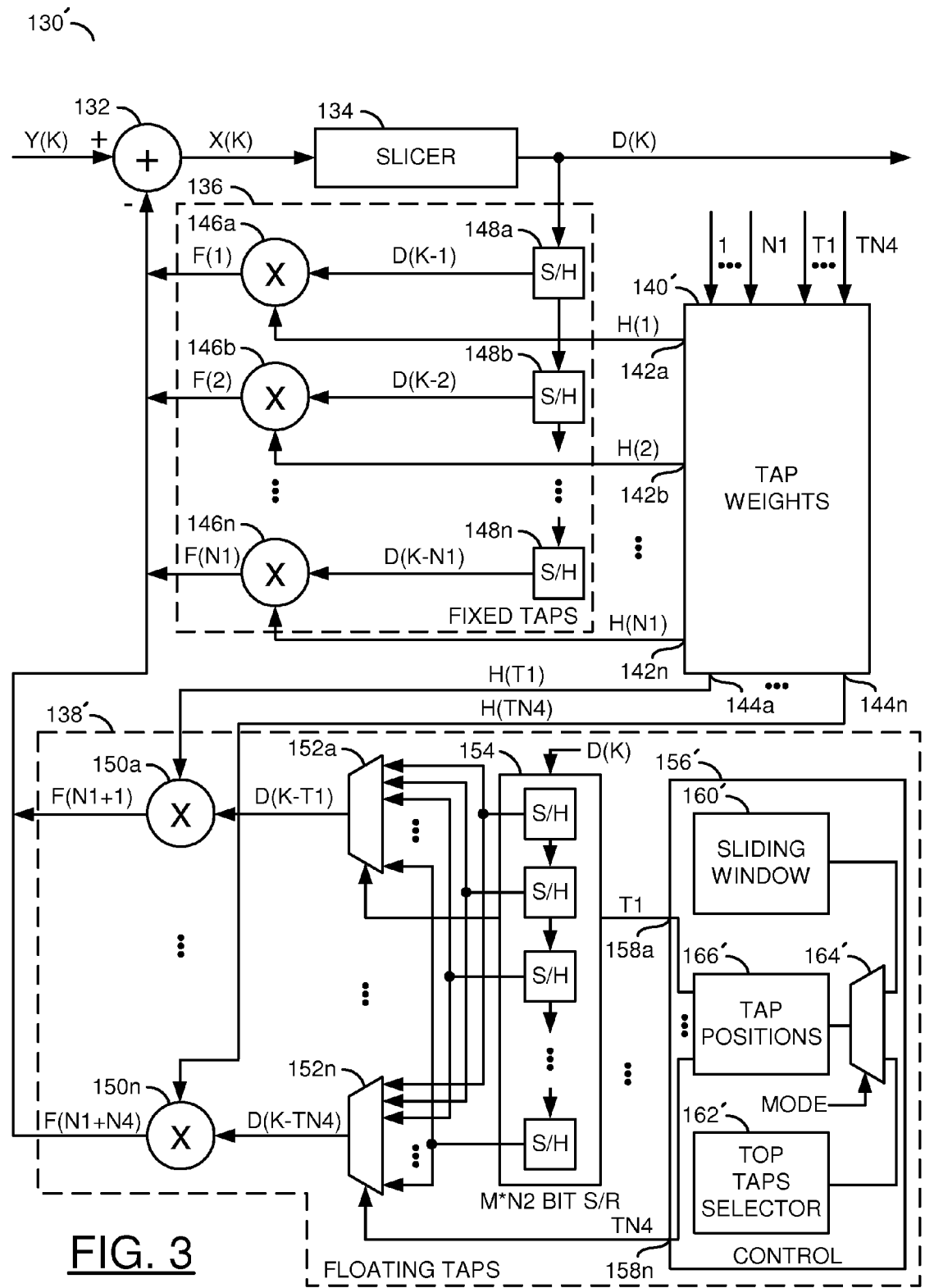
FIG. 3 is a block diagram illustrating still another embodiment of an adaptive floating tap decision feedback equalizer in accordance with the present invention.

Referring to FIG. 3, a block diagram of a decision feedback equalizer (DFE) 130' is shown illustrating still another embodiment of an adaptive floating tap decision feedback equalizer in accordance with the present invention. In the embodiments illustrated above in connection with FIGS. 1 and 2, the number of taps used in the sliding window (e.g., N3) was equal to N2, the number of floating taps. In general, the number of taps used in the sliding window may be any number greater than 0 and less than or equal to N, the total number of taps (e.g., 0<N3≦N). The DFE 130' may be implemented similarly to the DFE 130 of FIG. 2, with the exception that the number of tap positions implemented in the block 138' (e.g., N4) may be equal to the maximum of the number of floating taps and the number of taps used in the sliding window (e.g., N4=max(N2,N3)). However, although the number of taps implemented in the block 138' of the DFE 130' is N4, the block 154 is implemented with M*N2 bits (or stages) rather than M*N4. The blocks 138', 140', 156' 160', 162', 164', and 166' may be implemented similarly to the blocks 138, 140, 156 160, 162, 164, and 166 (described above in connection with FIG. 2) except that the blocks 138', 140', 156' 160', 162', 164, and 166' are adapted for N4 floating tap positions.

Figure 4:
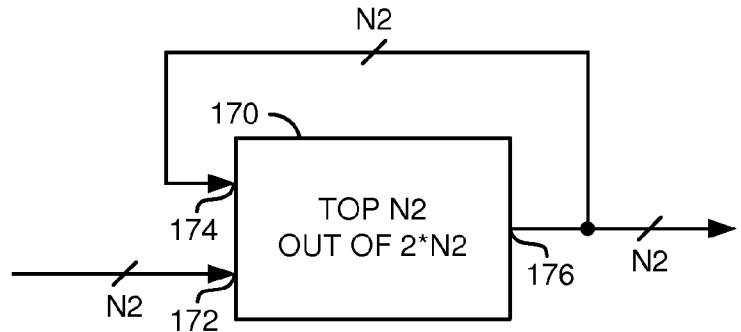
FIG. 4 is a block diagram illustrating a top N2 out of 2*N2 tap candidate selection block in accordance with the present invention.

Referring to FIG. 4, a block diagram is shown illustrating a top N2 out of 2*N2 tap selection block 170 implemented in accordance with a preferred embodiment of the present invention. The block 170 may be implemented as part of the top tap selector blocks 122, 162 and 162' in FIGS. 1-3, respectively. The block 170 may have a first input 172, a second input 174 and an output 176. The input 172 may receive signals representing the tap positions and tap weights of, in one example, N2 floating taps of the DFE. The input 174 may be connected to the output 176 to feedback the output of the block 170 into the decision process implemented by the block 170.

The block 170 may be configured to determine the tap positions with the greatest absolute tap weights from among the tap positions represented by the signals presented at (i) the first input and (ii) the second input. When the taps presented to the first input are the first taps to be examined (e.g., taps of a first sliding window), the values of the second input may set to zero. Subsequent determinations may be made between tap positions currently presented at the input 172 and the previous determination presented at the input 174. A more detailed explanation of an example operation of the block 170 is presented below in connection with FIGS. 6(A-C).

Figure 5:
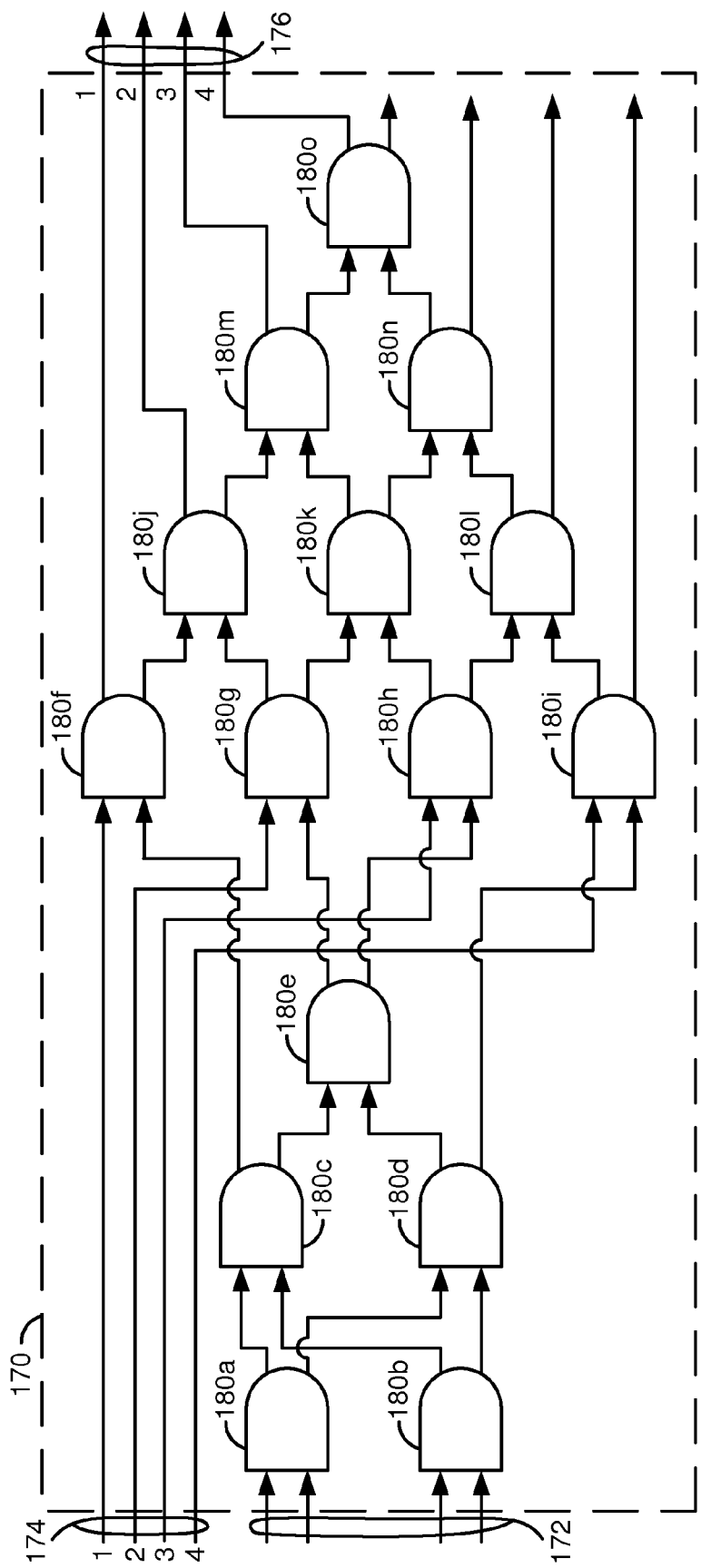
FIG. 5 is a block diagram illustrating an example implementation of the top N2 out of 2*N2 tap candidate selection block of FIG. 2.

Referring to FIG. 5, a more detailed block diagram is shown illustrating an example of the block 170 of FIG. 4 implemented in accordance with a preferred embodiment of the present invention. In the example above where N2 is implemented with a value of four, the block 170 may comprise a number of blocks 180a-180o. The blocks 180a-180o may be arranged such that the top N2 (e.g., four in the above example) candidates out of 2*N2 (e.g., eight in the above example) candidates are presented at the output of the block 170. In one example, the blocks 180a-180o may be implemented as comparator blocks (or circuits). The blocks 180a-180o may be arranged such that the top N2 candidates out of the 2*N2 candidates at the inputs 172 and 174 are retained and presented at the output 176 of the block 170. The example presented in FIG. 5 may be scaled to meet the design criteria of a particular implementation.

In one example, operation of each of the blocks 180a-180o may be explained using the example comparator 180. The comparator 180 may have an input 182 that may receive a signal (e.g., IN1), an input 184 that may receive a signal (e.g., IN2), an output 186 that may present a signal (e.g., OUT1) and an output 188 that may present a signal (e.g., OUT2). The comparator 180 may be implemented according to the following logic:

```
If |IN1| ≧ |IN2|,
    OUT1 = IN1
    OUT2 = IN2;
else
    OUT1 = IN2
    OUT2 = IN1.
```

Figure 6:
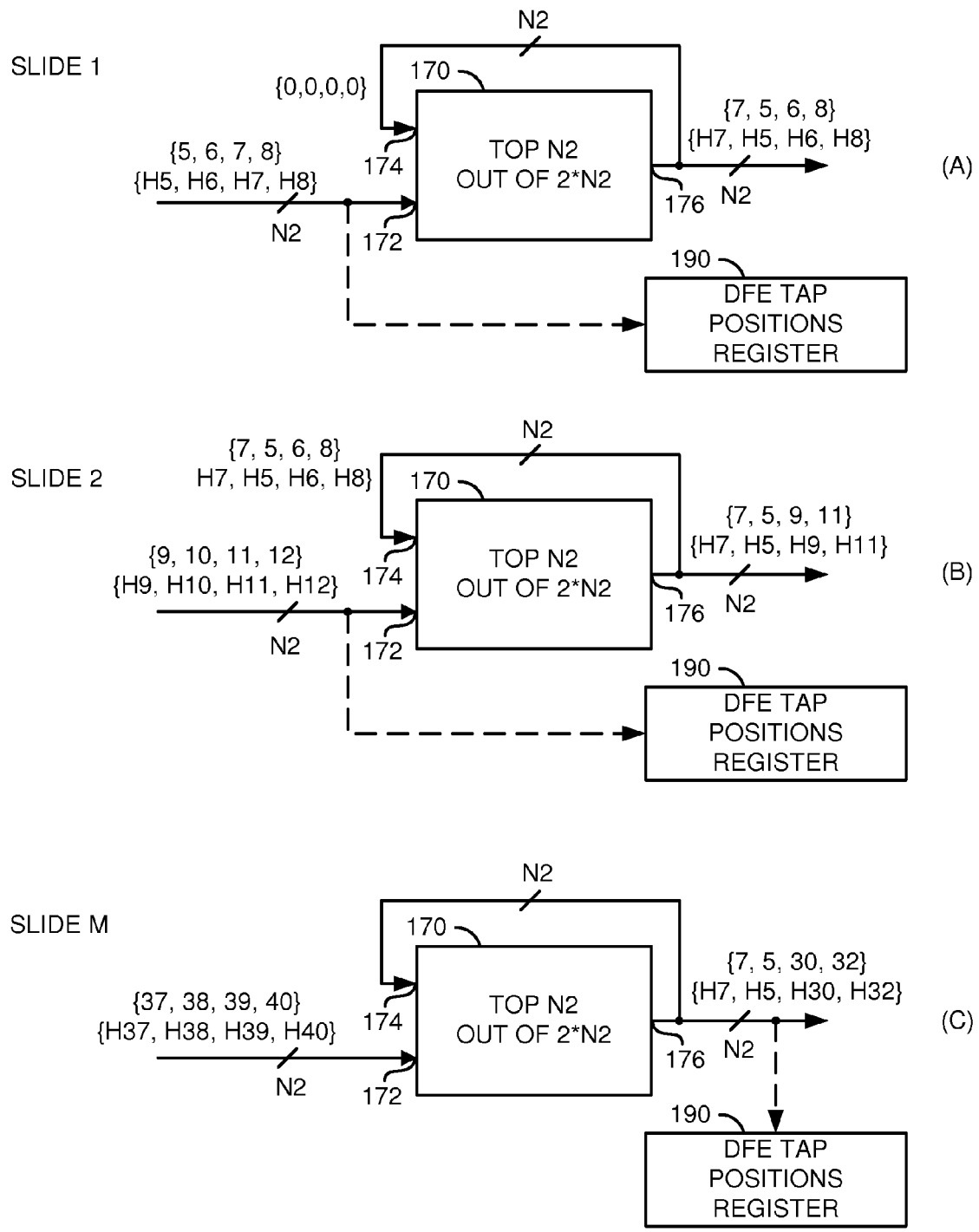
FIGS. 6(A-C) are block diagrams illustrating the top N2 out of 2*N2 tap candidate selection block of FIG. 2 during a number of slides in accordance with the present invention.

Referring to FIGS. 6(A-C), diagrams are shown illustrating the block 170 of FIG. 4 during a sequence of steps (or slides) in a sliding window process in accordance with the present invention. In a first step, or slide (e.g., FIG. 6(A)), the DFE is allowed to converge. After the DFE has converged, the tap positions 5-8 are obtained and presented with the corresponding tap weights H5-H8 to the input 172 of the block 170. The input 174 of the block 170 is set to zeroes. The tap positions and corresponding tap weights are presented at the output 176 of the block 170 arranged according to the absolute magnitude of the tap weights. For example, the order of the tap positions and tap weights at the input 172 may be {5, 6, 7, 8} and {H5, H6, H7, H8}, respectively, while the order at the output 176 may be {7, 5, 6, 8} and {H7, H5, H6, H8}, where |H7|>|H5|>|H6|>|H8|. The tap positions presented at the input 172 may be stored in a register 190 for presentation as the tap positions of the DFE 100 during the search mode. For example, the register 190 may be implemented as part of the blocks 126, 166 or 166' in FIGS. 1-3, respectively.

In a second step, or slide (e.g., FIG. 6(B)), the DFE is allowed to converge. When the DFE has converged, the tap positions 9-12 and the corresponding tap weights H9-H12 are obtained and presented to the input 172 of the block 170. The tap positions and tap weights from the first slide are presented to the input 174 of the block 170. The top N2 tap positions and corresponding tap weights presented at the output 176 may include taps from the first slide and/or taps from the current slide arranged based on greater absolute magnitude of the corresponding tap weights. For example, the order of the tap positions and corresponding tap weights at the input 172 may be {9, 10, 11, 12} and {H9, H10, H11, H12}, respectively, the tap positions and corresponding tap weights at the input 174 may be {7, 5, 6, 8} and {H7, H5, H6, H8}, respectively, and the top N2 tap positions and weights presented at the output 176 may be {7, 5, 9, 11} and {H7, H5, H9, H11}. The tap positions presented at the input 172 may be stored in the register 190.

The sliding window process of the present invention may continue for M slides, where M is the greatest integer equal to the number of tap positions to be covered by the floating taps divided by the number of taps that may be presented at the input 172 of the block 170. For example, if the number of tap positions to be covered by the DFE 130 is 36 and the number of taps that may be presented to the input of the block 170 is 8, M is equal to 5. In the Mth step, or slide (e.g., FIG. 6(C)), the DFE is allowed to converge. When the DFE has converged, the tap positions 37-40 and the corresponding tap weights H37-H40 are presented to the input 172 of the block 170. The top N2 tap positions and corresponding tap weights from the previous (M−1) slides are presented to the input 174 of the block 170. The N2 tap positions and corresponding tap weights presented at the output 176 of the block 170 represent the top N2 taps from taps 4-40 (e.g., the taps having the highest absolute magnitude tap weights). For example, the order of the tap positions and tap weights at the input 172 may be {37, 38, 39, 40} and {H37, H38, H39, H40}, respectively, while the tap positions and tap weights presented at the output 176 may be {7, 5, 30, 32} and {H7, H5, H30, H32}. The tap positions presented at the output 176 of the block 170 may be stored in the register 190 for presentation as the floating tap positions of the DFE in the normal operating mode and the corresponding tap weights may be presented via the signals H1-Hi of the DFE.

Figure 7:
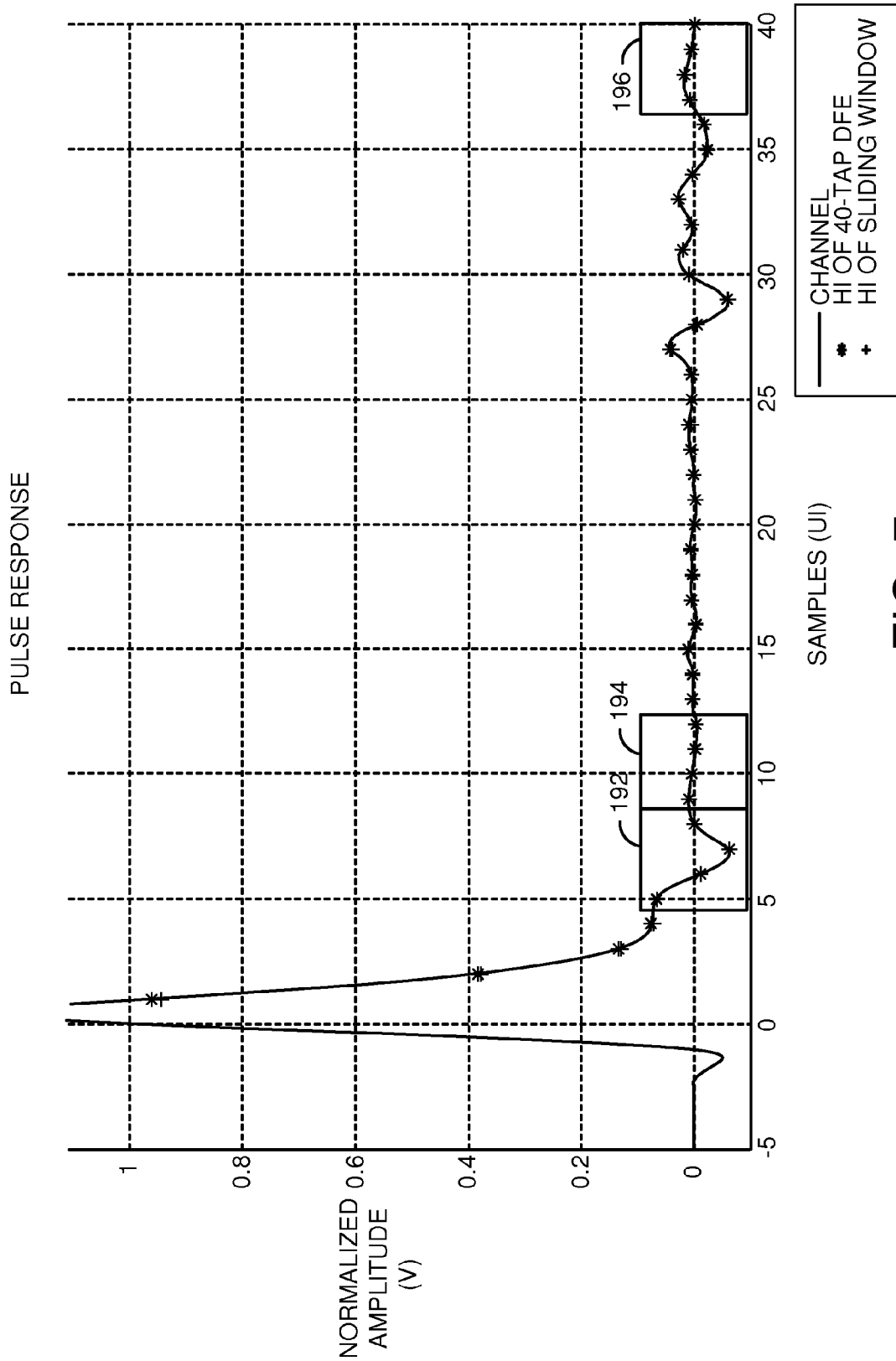
FIG. 7 is a graph illustrating a sliding window technique in accordance with the present invention.

Referring to FIG. 7, a graph is shown illustrating application of the sliding window technique in accordance with the present invention to an example channel pulse response. The example channel pulse response is shown as a solid line representing an amplitude of the pulse response normalized to sample 0. Locations of reflections correspond to parts of the response characterized by crests and troughs (e.g., samples 5-12, 25-40, etc.). Tap weights (HI) as found using a 40-tap DFE are illustrated with asterisks. Tap weights (HI) as found using the sliding window technique in accordance with the present invention are illustrated with plus (+) symbols. The tap weights found using the sliding window technique in accordance with the present invention are generally similar to the tap weights found using the 40-tap DFE (e.g., as illustrated by the co-localization of asterisks and plus symbols).

Windows 192, 194 and 196 are shown corresponding to the slides 1, 2 and M, respectively, discussed above in connection with FIGS. 6(A-C). By sliding the sampling (or sliding) window along the channel signal, the locations of reflections (e.g., locations where the normalized amplitude of the pulse response has crests and troughs) may be determined such that decision feedback equalization equivalent to a 40-tap DFE may be provided with fewer than forty taps. The sliding window technique in accordance with the present invention may provide performance similar to, or better than a 40-tap DFE. In one example, a floating tap architecture may provide a performance gain of up to 2 decibels (dB). In general, the sliding window technique in accordance with the present invention may provide performance similar to an N1+N2*M tap DFE using only N1+N2 taps.

For example, performance data (e.g., signal-to-noise ratio (SNR))) for a variety of architectures may be summarized in the following TABLE 1:

TABLE 1

| Architecture | Floating Taps | SNR (dB) |
| --- | --- | --- |
| 4 | N/A | 23.52 |
| 5 | N/A | 24.81 |
| 6 | N/A | 24.81 |
| 7 | N/A | 25.38 |
| 8 | N/A | 25.39 |
| 40 | N/A | 30.28 |
| 4 + 3 | (5, 7, 29) | 26.57 |
| 4 + 4 (or 5 + 3) | (5, 7, 27, 29) | 27.47 |
| 6 + 2 (or 7 + 1) | (7, 29) | 26.59 |
| 4 + 2 | (5, 29) | 25.72 |
| Group 4 + 3 | (5, 6, 7) | 25.38 |
| Group 5 + 3 | (27, 28, 29) | 26.52 |

Comparing a conventional DFE with eight fixed taps to a DFE implemented in accordance with the present invention having a combination of fixed and floating taps adding up to a total of eight taps, the DFE implemented in accordance with the present invention may provide up to a 2 dB performance gain (e.g., 27.47(4+4) or 26.59(6+2) vs. 25.39(8)).

The sliding window technique in accordance with the present invention may identify the locations of reflections in a wide range of channels. For example, a comparison between the floating taps identified using the sliding window technique in accordance with the present invention and the top 4 taps as identified by a conventional 40-tap DFE and corresponding signal-to-noise ratios (SNR) may be summarized as in the following TABLE 2:

TABLE 2

| Ch. | Reflect | Floating Taps (Sliding Window) | Top 4 taps (by 40-tap DFE) | SNR (dB) | SNR* (dB) |
| --- | --- | --- | --- | --- | --- |
| A | Large | (5, 29, 7, 27) | (5, 29, 7, 27) | 27.47 | |
| B | Large | (30, 5, 8, 32) | (30, 8, 5, 32) | 30.11 | |
| C | Large | (5, 27, 29, 7) | (5, 29, 27, 7) | 27.26 | |
| D | Large | (5, 29, 30, 8) | (5, 29, 8, 31) | 29.70 | 29.55 |
| E | Large | (23, 5, 24, 22) | (23, 24, 22, 25) | 31.81 | 31.78 |
| F | Large | (17, 20, 16, 5) | (17, 5, 20, 16) | 34.09 | |

TABLE 2-continued

| Ch. | Reflect | Floating Taps (Sliding Window) | Top 4 taps (by 40-tap DFE) | SNR (dB) | SNR* (dB) |
|---|---|---|---|---|---|
| G | Large | (5, 27, 6, 15) | (27, 15, 17, 6) | 33.55 | 33.49 |
| H | Small | (5, 6, 7, 24) | (5, 6, 7, 9) | 30.23 | 30.31 |
| I | Small | (5, 6, 7, 9) | (5, 6, 7, 9) | 30.21 | |
| J | Small | (5, 6, 7, 8) | (5, 6, 7, 8) | 29.61 | |
| K | Small | (5, 6, 7, 8) | (5, 6, 7, 8) | 29.43 | |

The two techniques found the same four taps, arranged similarly for channels A, I, J AND K. For channels B, C and F, the two techniques found the same four taps, with a slight variation in arrangement (e.g., the third or fourth largest tap differing). Even when the two techniques do not obtain the same four taps (e.g., channels D, E, G and H), the signal-to-noise ratio between the two techniques is similar (e.g. as shown by the values SNR* obtained with only the top 4 taps as identified by a 40-tap DFE).

Figure 8:
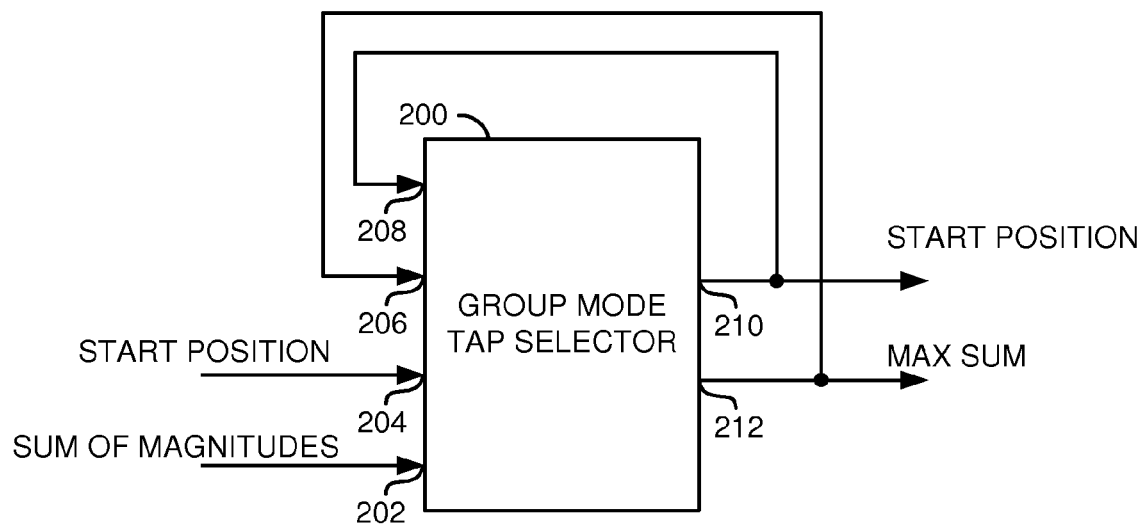
FIG. 8 is a block diagram illustrating a group mode tap candidate selection block in accordance with the present invention.

Referring to FIG. 8, a block diagram is shown illustrating a group mode tap selector 200 for adaptive selection of floating taps in a decision feedback equalizer. The top taps selector (e.g., block 122 of the DFE 100, block 162 of the DFE 130, etc.) may be simplified by implementing a group mode. In one example, the top taps selector may be replaced by the group mode tap selector 200. The group mode tap selector may have an input 202 that may receive a signal (e.g., SUM OF MAGNITUDES), an input 204 that may receive a signal (e.g., START POSITION), an input 206 that may receive a signal (e.g., MAX SUM), an input 208 that may receive a signal (e.g., START POSITION), an output 210 that may present the signal START POSITION and an output 212 that may present the signal MAX SUM.

After each slide, the start position of a current group of N2 consecutive tap positions and the sum of the magnitudes of the tap weights of the current group of N2 consecutive tap positions may be input to the block 200. The block 200 may be configured to output the maximum sum and the corresponding start position. Instead of finding the best N2 out of 2*N2, only the best group of N2 out of N2*M are found. The implementation is generally much simpler, and may be implemented using one comparator.

For the above example, N2*M slides would generally be performed. In another example, only M slides would be performed. For example, after each slide, N2 sums may be obtained from the current N2 tap weights and the buffered N2−1 tap weights from the previous slide. The N2 sums would be fed into the block 200 one by one. Although the above example would involve implementation of a simple state machine to control the sequence, the search time would be reduced by N2 times.

In the more general setting, a system may be implemented with a number (e.g., N5) of groups of floating taps. Within each group, the floating tap positions may be consecutive. For example, a system may have two groups: (7, 8, 9) and (29, 30, 31). In this example, the block 200 would receive the sum of magnitudes as the input, but the output would be the best of N5 sums. The logic may be implemented similarly to the best N2 out of 2*N2 block 170. However, with N5 implemented much smaller than N2, the circuit implementation may be simpler.

Regardless of whether the system implemented finds N2 independent floating tap positions or a group/multiple groups of floating tap positions, the metric used to select the candidates is not limited to the magnitude of the tap weights. For example, the present invention may be implemented accordingly using other metrics such as signal-to-noise-ratio (SNR), eye opening, bit error rate (BER), etc.

Figure 9:
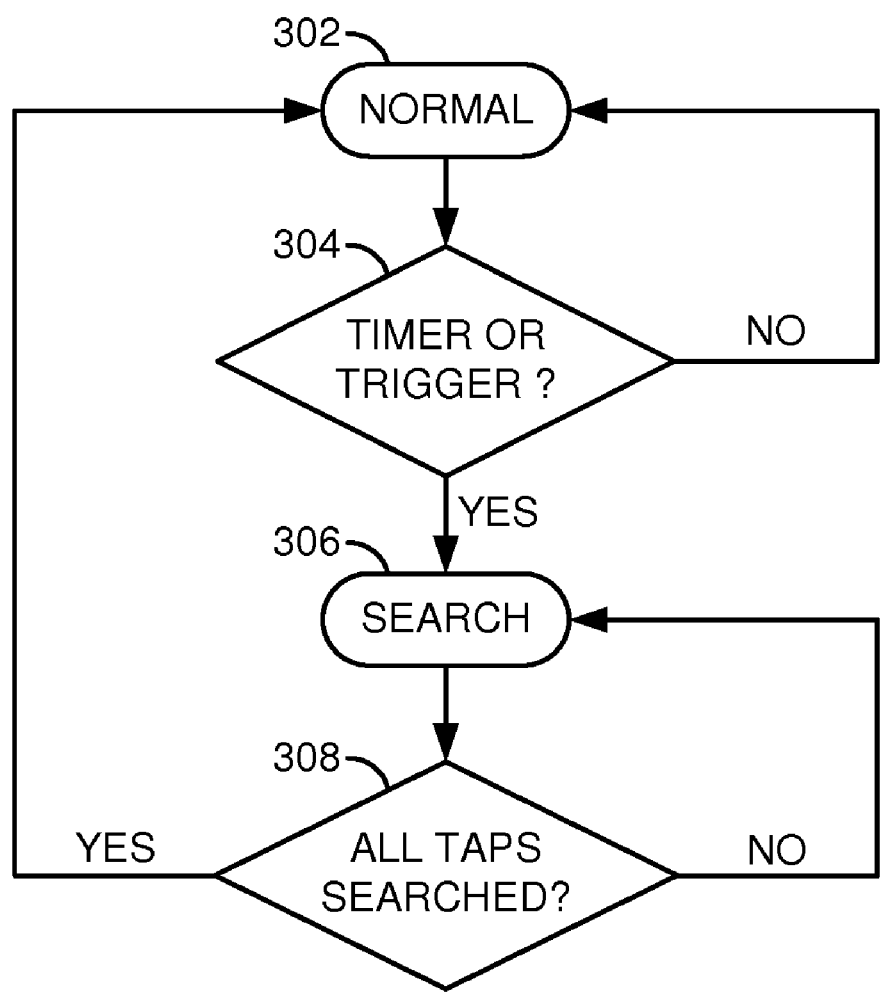
FIG. 9 is a flow diagram illustrating a process for adaptive selection of floating taps in a decision feedback equalizer in accordance with the present invention.

Referring to FIG. 9, a flow diagram is shown illustrating a process 300 for adaptive selection of floating taps in a decision feedback equalizer in accordance with the present invention. The process 300 may comprise a state 302, a decision state 304, a state 306 and a decision state 308. The state 302 may be implemented as a normal operating mode or state. The state 304 may be implemented as a start search decision state. The state 306 may be implemented as a search mode or state. The state 308 may be implemented as a end search decision state.

The system typically stays in the normal operating state 302, in which the floating tap positions are fixed to either (i) default values or (ii) floating tap positions found when a search was performed (e.g., by entering the search mode at least once). While in the normal operating state 302, the process 300 may transition through the decision state 304 to determine whether a trigger condition for initiating a search (e.g., a trigger from an external source or a timeout trigger of the internal timer) has occurred. When a trigger has occurred, the system may enter the search state 306. In the search state 306, the floating tap positions are searched. While in the search state 306, the process 300 may transition through the decision state 308 to determine whether the search has been completed. When the search has been completed, the system may return to the normal operating state 302.

Figure 10:
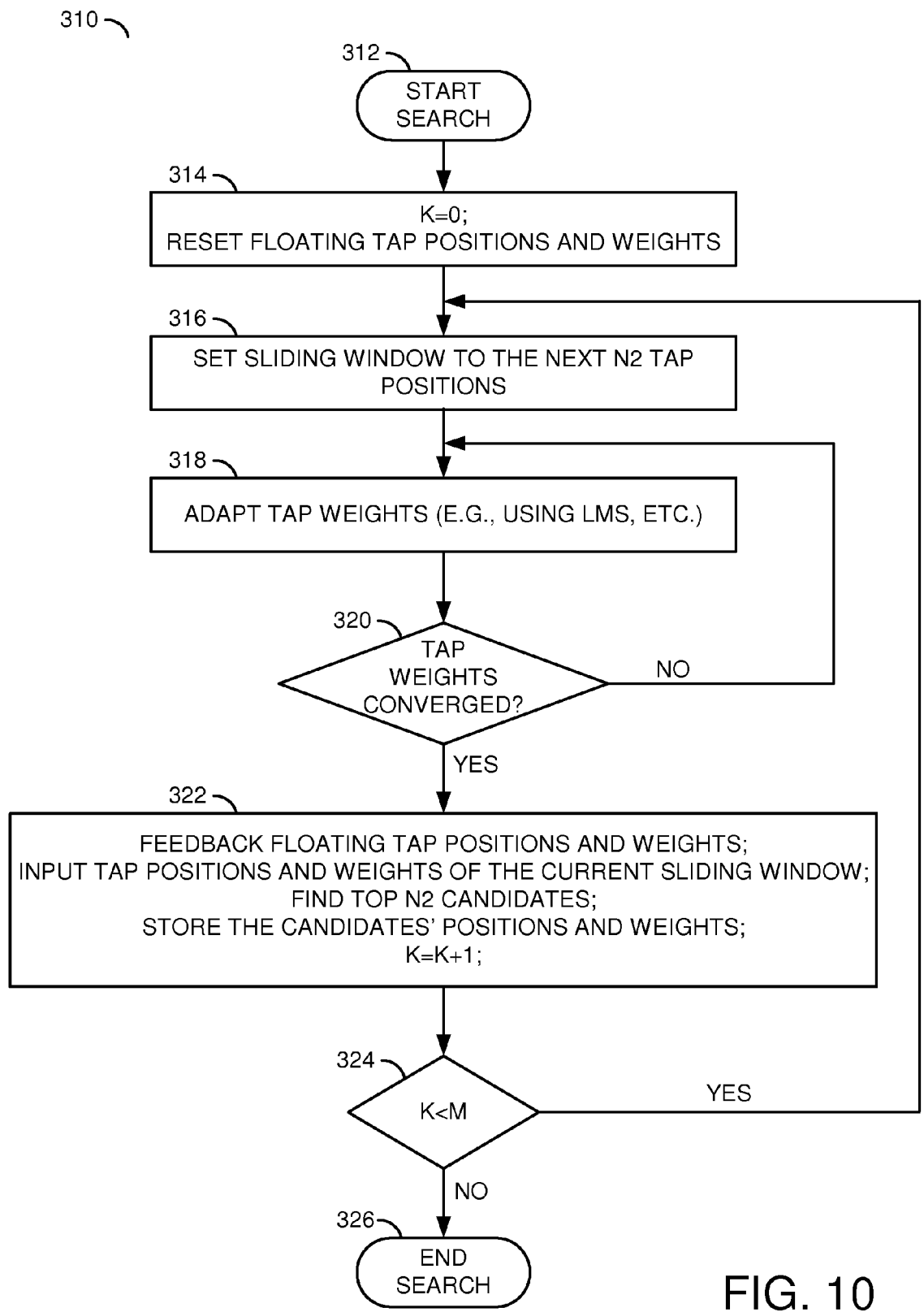
FIG. 10 is a flow diagram illustrating a search process for adaptive selection of floating taps in a decision feedback equalizer in accordance with the present invention.

Referring to FIG. 10, a flow diagram is shown illustrating a search process 310 in accordance with the present invention. The search process 310 may comprise a state 312, a state 314, a state 316, a state 318, a decision state 320, a state 322, a decision state 324, and a state 326. The state 312 may be implemented as a start search state. The state 314 may be implemented as an initialization state. The state 316 may be implemented as a sliding window positioning state. The state 318 may be implemented as an adaptation state. The decision state 320 may be implemented as a convergence decision state. The state 322 may be implemented as a top candidate determining state. The decision state 324 may be implemented as an end of sliding range determination state. The state 326 may be implemented as an end of search state.

Upon entering the search mode 306, the system may start the search process 310 by moving from the start search state 312 to the initialization state 314. In the state 314, the process 310 may set a sliding window index (e.g., K) to zero and reset registers storing the floating tap positions and tap weights. When the sliding window index has been set to zero and the registers storing the floating tap positions and tap weights reset, the process 310 may move to the state 316. In the state 316, the process 310 may start evaluation of the first sliding window by, in one example, setting the tap positions to be 1, 2, 3, . . . , N1, N1+1, N1+2, . . . , N1+N2. While remaining in the search mode, the tap weights of the N1+N2 tap DFE based on the current tap positions may be adapted (e.g., using a least mean squares (LMS) method) until convergence. For example, the process 310 may transition to the state 320 to determine whether the tap weights have converged. In one example, convergence may be determined by comparing the number of symbols since the beginning of the adaptation to a threshold determined from offline simulations. In another example, the tap weights may be checked to determine whether the weights have changed. If the tap weights of the same tap do not change significantly, the tap may be considered to have converged. However, other methods for determining when the adaptation has converged may be implemented to meet the design criteria of a particular implementation.

When the tap weights have not converged, the process 310 may continue adapting the tap weights. When the tap weights have converged, the process 310 may move to the state 322. In the state 322, the process 310 uses the current tap positions and corresponding taps weights and a feedback of previous determined tap positions and corresponding tap weights of the top N2 candidates and selects N2 candidates with the largest tap weights (e.g., in terms of absolute value, etc.). The process 310 may store the selected N2 candidates with the largest tap weights and increment the sliding window index by 1. The process 310 may then move to the state 324.

In the state 324, the process 310 may check to determine whether the search is complete. In an example where a DFE has fixed taps that are contiguous from 1–N1, the process 310 may check whether the sliding window index K is less than the a predetermine number (e.g., M) of slides for covering the range of taps covered by the DFE. If the sliding window index K is less than M, the process 310 may stay in the search mode and return to the state 316 to move the sliding window to the next position (e.g., by setting the tap positions to be 1, 2, 3, . . ., N1, N1+N2+1, N1+N2+2, N1+2*N2. The above processing steps may be repeated until the N2 candidates with the largest tap weight magnitudes (e.g., in terms of absolute value, etc.) among the tap positions from N1+1 to N1+2*N2 are found.

When the sliding window index K has the value M, the process 310 may move to the state 326 to exit the search mode and return to the normal operation mode. When the search mode is exited, the N2 candidates with the largest tap weights (e.g., in terms of absolute value, etc.) among the tap positions from N1+1 to N1+M*N2 have generally been found. The top N2 tap positions found by the process 310 are generally set to be the floating tap positions in the normal operation mode.

The present invention generally uses decision feedback equalization (DFE) to estimate the pulse response of a channel. The DFE tap weights generally provide indications of the pulse response amplitudes at the corresponding tap locations. The DFE tap weights may be adapted (e.g., using a least mean square (LMS) technique, etc.). A sliding window approach in accordance with the present invention may be implemented to search for the floating tap positions quickly and with low implementation complexity. In one embodiment, a first number of taps (e.g., N1) may be fixed and a second number of taps (e.g., N2) may be floating. The N2 tap positions may slide from a current set of N2 tap positions to a next set of N2 tap positions in a next slide. For example, in a first slide, the N2 taps may be positioned at tap positions N1+1, . . . , N1+N2. In a second slide, the N2 taps may slide (or move) to positions N1+N2+1, . . . , N1+N2+N2. The N2 taps may continue sliding for M slides, where M is an integer determined by a width of the sliding window and a range of taps to be covered. By performing M slides with the N2 floating taps, a range of N1+N2*M may be covered using only N1+N2 taps.

In each slide, tap weights of the N1+N2 DFE taps may be adapted using, for example, the LMS method until convergence. The current N2 tap weights may be stored and compared with previous N2 tap weights. The N2 taps with, for example, the largest magnitude (e.g, absolute value) become the new selected taps. For example, the top N2 out of 2*N2 candidates and the respective tap positions may be stored. At the end of the last slide, the positions of the surviving (largest) N2 taps may be set as the floating tap positions for the DFE.

In another embodiment, all of the N1+N2 taps may be allowed to float. In yet another embodiment, the number of taps sliding may be different from the number of taps floating. For example, all N1+N2 taps may slide during a search mode to reduce a corresponding search time. However, in an operating mode, the first N1 taps may be fixed while updates are performed using the N2 floating taps. In another example, N3 taps may be allowed to slide, where N3 may be less than N2.

In one embodiment, the present invention may fix the first four taps because the tap weights of the first four taps are typically larger than the tap weights of the rest of the taps. Fixing the first four taps may help reduce the search time and implementation complexity. In addition to the fixed taps, a number of floating taps may be determined simultaneously. For example, four floating tap positions may be set to be taps 5, 6, 7, and 8. After adaptation, four corresponding tap weights may be determined simultaneously. The four floating tap positions may be moved (or slid) to be taps 9, 10, 11, and 12. The tap weights obtained for taps 9-12 may be compared to the previous four tap weights and the top four tap weights and the corresponding tap positions stored. The four floating tap positions may be set to taps 13, 14, 15, and 16 and the same procedure repeated. In the above example, the present invention may allow determining the four floating tap positions in the range of 40 taps with only nine iterations (or slides). In contrast, the conventional technique would iteratively adapt and check tap weights of all 40 tap positions for each floating tap position for a total of 320 iterations (i.e., 8×40(320)). The conventional technique has a disadvantage of finding duplicate tap positions.

The present invention generally eliminates the duplicate tap positions problem present in the conventional technique. Furthermore, because a number of taps may be fixed to effectively cancel out most of the ISI during a search for floating tap positions, the performance during the search generally does not degrade significantly. Even if only one floating tap at a time is determined using the sliding window technique of the present invention, the search may be completed with 40 slides instead of 320 slides and still provide the benefit of no duplicate tap positions and reduced degradation.

The present invention generally implements a dynamic search. In one embodiment, when a trigger from an external source is received or a timeout event from an internal timer occurs, a search operation for the best floating tap positions may be started to update current tap positions. In another embodiment, a system implementing a DFE in accordance with the present invention may automatically search for the best floating tap positions during initialization and not update the positions once the search is complete. In one example, a system implementing a DFE in accordance with the present invention may search for a number of independent floating tap positions. In another example, a system implementing a DFE in accordance with the present invention may balance performance with simplicity of implementation by implementing a search using a group or multiple groups of consecutive tap positions.

The present invention may be implemented as analog circuitry, digital circuitry and/or a combination of analog and digital circuitry. The present invention may also be implemented as computer executable instructions (e.g., software, firmware, etc.) stored in a computer readable medium. The function performed by the flow diagrams of FIGS. 9 and 10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for adaptive selection of floating taps in a feedback path of a decision feedback equalizer comprising the steps of:
   (A) switching the decision feedback equalizer from an operating mode to a search mode in response to a trigger event and determining values for a predefined metric for tap positions within a range covered by the decision feedback equalizer (DFE); and
   (B) setting one or more floating taps in the feedback path of the DFE to tap positions based upon said values of said predefined metric, wherein a sliding window process using a sliding window containing a plurality of tap positions is used to determine the tap positions of the one or more floating taps in the feedback path of the DFE, and said sliding window process comprises adapting tap weights of the DFE to obtain current tap weight magnitudes and, when the tap weights converge, updating tap positions and tap weights of the DFE based upon a comparison of current tap positions and tap weight magnitudes with previous tap positions and tap weight magnitudes, and said DFE is returned to said operating mode when said one or more floating taps have been set.

2. The method according to claim 1, wherein said predefined metric comprises one or more criteria selected from the group consisting of tap weight magnitude, signal-to-noise-ratio (SNR), eye opening and bit error rate (BER).

3. The method according to claim 1, wherein the sliding window process is used to determine the tap positions with larger tap weight magnitudes.

4. The method according to claim 1, further comprising:
   repeating the sliding window process for a plurality of sliding window positions in the range covered by said DFE.

5. The method according to claim 1, wherein for a first sliding window position the previous tap positions and tap weights are set to zero.

6. The method according to claim 1, wherein the tap positions of said floating taps in the feedback path of said DFE are dynamically updated.

7. The method according to claim 1, wherein the tap positions of said floating taps in the feedback path of said DFE are set independently.

8. The method according to claim 1, wherein the tap positions of said floating taps in the feedback path of said DFE are set as a group of consecutive tap positions.

9. The method according to claim 1, wherein the tap positions of said floating taps in the feedback path of said DFE are set as multiple groups of consecutive tap positions.

10. The method according to claim 1, wherein the tap positions of said floating taps in the feedback path of said DFE are updated in real time without interrupting data traffic.

11. The method according to claim 1, wherein the tap positions of said floating taps in the feedback path of said DFE are updated automatically with changes in reflection locations.

12. The method according to claim 1, wherein a plurality of the tap positions of said floating taps in the feedback path of said DFE are searched in parallel.

13. The method according to claim 1, further comprising:
   setting one or more taps in the feedback path of said DFE to fixed positions to reduce inter symbol interference during a search for floating tap positions.

14. The method according to claim 1, further comprising:
   providing one or more taps in the feedback path of said DFE with fixed tap positions within said range.

15. The method according to claim 1, wherein said sliding window process further comprises:
   setting a position of the sliding window containing the plurality of tap positions; and
   updating which tap positions of the sliding window have larger tap weight magnitudes and storing corresponding tap weights.

16. The method according to claim 15, wherein said sliding window process further comprises:
   updating which tap positions of the DFE have larger tap weight magnitudes and storing corresponding tap weights.

17. A method for selecting floating taps in a feedback path of a decision feedback equalization process comprising the steps of:
   operating a decision feedback equalizer (DFE) having a feedback path comprising one or more floating taps in a normal operation mode;
   switching the DFE to a search mode in response to a trigger event;
   setting the one or more floating taps in the feedback path of the DFE to tap positions determined using a predefined metric during the search mode, wherein a sliding window process using a sliding window containing a plurality of tap positions is used to determine the tap positions of the one or more floating taps in the feedback path of the DFE, and said sliding window process comprises adapting tap weights of the DFE to obtain current tap weight magnitudes and, when the tap weights converge, updating tap positions and tap weights of the DFE based upon a comparison of current tap positions and tap weight magnitudes with previous tap positions and tap weight magnitudes; and
   returning the DFE to the normal operating mode.

18. The method according to claim 17, wherein said predefined metric comprises one or more criteria selected from the group consisting of tap weight magnitude, signal-to-noise-ratio (SNR), eye opening and bit error rate (BER).

19. The method according to claim 17, wherein said trigger event comprises one or more types of events selected from the group consisting of a trigger signal from an external source, a timeout event from an internal timer and an initialization of a system containing the DFE.

20. A method for reducing inter symbol interference (ISI) in a channel using decision feedback equalization, comprising the steps of:
   (A) switching a decision feedback equalizer(DFE) from an operating mode to a search mode in response to a trigger event and determining values for a predefined metric for tap positions within a range covered by the decision feedback equalizer; and (B) setting one or more floating taps in a feedback path of the DFE to tap positions based upon said values of said predefined metric, wherein a sliding window process using a sliding window containing a plurality of tap positions is used to determine the tap positions of the one or more floating taps in the feedback path of the DFE, and said sliding window process comprises adapting tap weights of the DFE to obtain current tap weight magnitudes and, when the tap weights converge, updating tap positions and tap weights of the DFE based upon a comparison of current tap positions and tap weight magnitudes with previous tap positions and tap weight magnitudes, and said DFE is returned to said operating mode when said one or more floating taps have been set.

21. The method according to claim 20, wherein said predefined metric comprises one or more criteria selected from the group consisting of tap weight magnitude, signal-to-noise-ratio (SNR), eye opening and bit error rate (BER).

22. The method according to claim 20, wherein the channel comprises a wireless communications link in a wireless application selected from the group consisting of digital video terrestrial transmission, High Definition Television (HDTV), digital television (DTV), Mobile TV, underwater acoustic telemetry, broadband wireless, fixed wireless access, microwave links, wireless local area networks (WLAN), cellular networks, multiple-input multiple output (MIMO), indoor wireless, audio monitors, monitoring of radio data transmissions, position detection in automotive applications, and satellite communications.

23. The method according to claim 20, wherein the channel comprises a wired communications link of a wired application selected from the group consisting of two-wire channels, Gigabit Ethernet, 10G Ethernet, high-speed backplane data communications, long-haul WDM systems/fiber/optical fiber communications, DSL/ADSL/dial-up telephone network/voice band modem, disk drives, magnetic storage, digital holographic optical memory systems, cable modem/CATV/video and data services through coaxial cable networks, and digital calibration of analog impairments.

24. A method for adaptive selection of floating taps in a feedback path of a decision feedback equalizer comprising the steps of:

(A) switching the decision feedback equalizer from an operating mode to a search mode in response to a trigger event and determining values for a predefined metric for tap positions within a range covered by the decision feedback equalizer (DFE); and (B) setting one or more floating taps in the feedback path of the DFE to tap positions based upon said values of said predefined metric, wherein a sliding window process using a sliding window containing a plurality of tap positions is used to determine the tap positions of the one or more floating taps in the feedback path of the DFE, said sliding window process comprises (i) setting a position of the sliding window containing the plurality of tap positions, (ii) updating which tap positions of the sliding window have larger tap weight magnitudes and storing corresponding tap weights, and (iii) updating which tap positions of the DFE have larger tap weight magnitudes and storing corresponding tap weights, and said DFE is returned to said operating mode when said one or more floating taps have been set.

* * * * *